May 19, 1925.
C. F. FLEMMING
1,538,789
FLOAT AND METHOD OF MAKING SAME
Filed Aug. 26, 1921
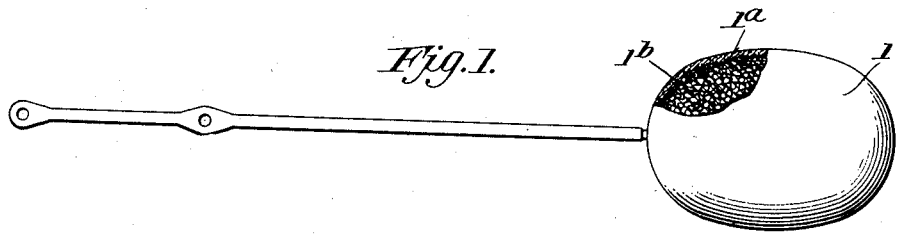
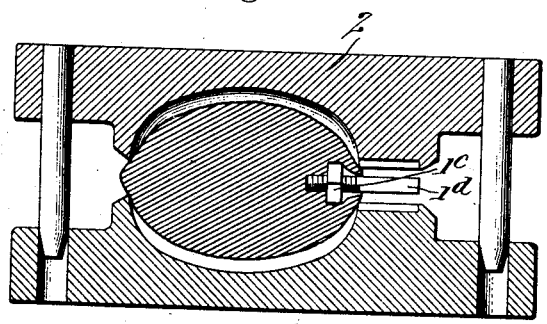
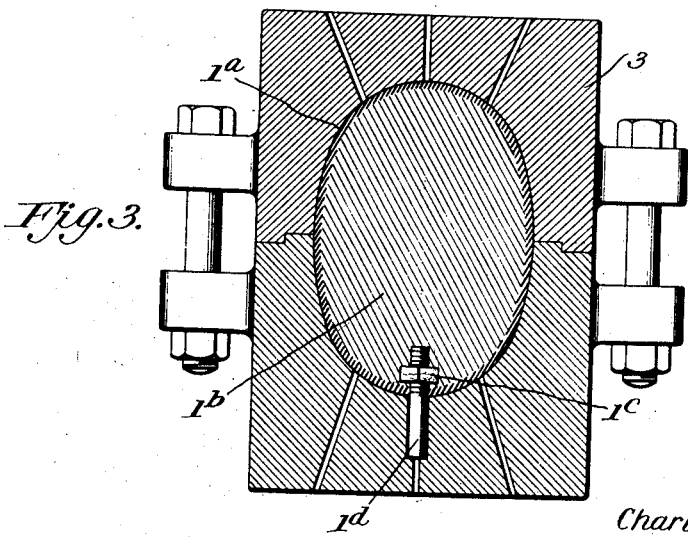
Inventor
Charles F. Flemming.
By *Spear Middleton Donaldson & Hall*
Attorney Patented May 19, 1925.

1,538,789

UNITED STATES PATENT OFFICE.

CHARLES F. FLEMMING, OF AKRON, OHIO.

FLOAT AND METHOD OF MAKING SAME.

Application filed August 26, 1921. Serial No. 495,454.

*To all whom it may concern:*

Be it known that I, CHARLES F. FLEMMING, a citizen of the United States, and resident of Akron, in the county of Summit and State of Ohio, have invented certain new and useful Improvements in Floats and Methods of Making Same, of which the following is a specification.

My present invention relates to improvements in hard rubber articles and the process of making the same. For convenience I have shown and described it in connection with floats such as used for example for fish nets, life preservers, buoys, tank floats, etc., though it will be understood that I do not limit myself to any particular article.

The invention aims to provide a light and strong article having a substantially smooth exterior impervious to liquid indefinitely, and which may be economically produced, and can be handled or shipped without danger of breakage or damage.

With these and other objects in view the invention includes the novel article and method of making the same hereinafter described and defined by the appended claims.

In order that my invention may be better understood I have appended hereto explanatory drawings in which—

Figure 1 is a view partly in section and partly broken away showing a float adapted as a tank float.

Fig. 2 is a sectional view of a conventional nature showing the blank in a cold pressing mold, and Fig. 3 is a similar view showing the completed article in the vulcanizing mold.

My improved article of manufacture is shown in the drawings as a float designed for use in any required situation or for any desired purpose, and indicated by the numeral 1.

It is formed of hard vulcanized india rubber and possesses an interior cellular structure with the walls of the cells unbroken or intact and the interior of the cells voids, such interior cellular structure being indicated at 1$^a$.

Preferably the exterior surface of the float is substantially smooth or non-cellular as indicated at 1$^b$.

In the manufacture of my improved float I take a suitable hard rubber vulcanizing compound and incorporate therein a blowing agent, or material which under the action of vulcanizing heat, will be gasified and produce throughout the body of the rubber a multiplicity of cells, a ground or comminuted textile or fibrous material being sometimes incorporated.

As an example of such a rubber compound the following may be mentioned:

|  | Parts. |
|---|---|
| Crude rubber | 50 |
| Sulphur | 23 |
| Ground cotton or wool | 5 |
| Mineral rubber | 22 |

The crude rubber is first broken down in a mill in the manner well understood by those skilled in the art and thereafter the mineral rubber, sulphur, and ground cotton or wool are added, preferably in the order named, and thoroughly mixed. To the mixture is added approximately as much water as will be absorbed by the mixture on the mill rolls, for example, three quarts of water for every one hundred pounds of the mixture, whereafter it is removed from the mill and divided into portions of the desired size. This is preferably accomplished by placing the compound in an extruding machine which delivers it in bars of a shape or size depending on the shape or size of the articles to be produced, the extruding machine having changeable extruding dies.

The extruded bar is then cut to suitable lengths which are placed in a cold pressing die such as indicated at 2 where or by which it is pressed to the shape desired for the finished article but of smaller volume, for example, one-third the size.

When a handle or attaching device is desired for the float or other article this may be conveniently provided by molding a metal insert in the article while in the pressing dies.

For a tank float, for example, a metal bushing 1$^c$ (threaded) could be screwed onto a rod 1$^d$ and by using the rod as a handle the bushing may be forced into the blank at the desired point, the blank being thereafter placed in the pressing mold or die which is provided with a recess to receive the handle. The pressing dies or molds may conveniently be brought together in a hydraulic press whereby the blank is pressed to the desired shape, the compound compacted around the bushing, and any excess compound squeezed out and trimmed off.

The formed blank is now transferred to a curing mold 3 having a recess for supporting the rod or core print. The curing mold, which is well vented, is bolted together and placed in an open steam heater or vulcanizer, where it is immediately subjected to the heat and pressure incidental to the presence of steam at, for example, sixty pounds per square inch pressure. Curing is continued for sufficient time to change the compound to hard rubber, for example three hours. The venting of the mold allows the steam to contact with the rubber. During the cure the action of the heat on the water causes steam to be formed within the compound and the expansion of this forms the cellular structure of the article. The outer cells collapse to a certain extent and form a shell of appreciable thickness which is only slightly cellular and this shell contacts with the mold walls which prevent greater expansion and which therefore forms a substantially smooth exterior surface.

When the stock has been cured for the time stated above or enough to cure to the proper hardness, the cure varying with different compounds, the steam is shut off and the molds cooled while still in the vulcanizer, being preferably sprayed with cold water, pipes being provided in the heater for this purpose. The molds being of metal cool quickly and the outer shell of rubber in contact therewith will also be chilled before the inside of the articles, so that the shell is rigidly set before the gases condense or shrink. The molds are then unbolted and the articles removed. The subsequent cooling of the interior of the article causes the gases to condense, leaving the interior cells as practically voids or under substantial vacuum. In other words, while the cell forming material remains in the cell due to condensation, upon cooling of the article the cells are practically empty.

I claim:

1. An article of manufacture composed of hard vulcanized rubber molded to the desired size and shape having a cellular structure with the walls of the cells intact, and having a substantially smooth imperforate exterior surface.

2. An article of manufacture a float composed of hard vulcanized rubber having a cellular structure with the walls of the cells intact, and having a substantially smooth imperforate exterior surface and having attaching means embedded in the body of the float.

3. An article of manufacture a float of rigid molded material having its interior provided with a multiplicity of cells the interiors of which are voids, the walls of the cells being intact.

4. An article of manufacture composed of hard vulcanized rubber molded to the desired size and shape having a relatively thick, hard, smooth, impervious outer shell, and an interior cellular formation, the walls of the cells being unbroken and of a thin diaphanous nature.

5. The hereindescribed method of making hard rubber articles which consists in shaping a hard rubber vulcanizing compound containing a blowing agent, curing the shaped article under heat and pressure, and chilling the surface of the article in advance of the cooling of the interior.

6. The hereindescribed method of making hard rubber articles which consists in shaping a hard rubber vulcanizing compound containing a blowing agent, subjecting the article in a vented mold to the curing action of steam, and chilling the surface of the article in advance of the interior thereof.

7. The hereindescribed method of making hard rubber articles which consists in cold pressing to the desired shape a hard rubber vulcanizing compound containing a blowing agent, subjecting the shaped article to a vulcanizing temperature in a suitable mold, and chilling the surface of the article in advance of the interior thereof.

8. The herein described method of making hard rubber articles, which consists in shaping a hard rubber vulcanizing compound containing a blowing agent, confining the article in a closed vented mold cavity, subjecting the article while so confined to the curing action of steam, chilling the surface of the article before the interior thereof, and thereafter opening the mold and removing the article.

9. An article of manufacture composed of hard vulcanized rubber molded to the desired size and shape, having a cellular structure and having a substantially smooth imperforate exterior surface.

10. An article of manufacture composed of hard vulcanized rubber compound having an imperforate outer surface and a cellular interior structure, with the walls of the cells intact and their interiors substantially voids.

In testimony whereof I affix my signature.

CHARLES F. FLEMMING.